United States Patent
Mansor et al.

(10) Patent No.: US 11,915,594 B2
(45) Date of Patent: Feb. 27, 2024

(54) COLLISION AVOIDANCE METHOD AND SYSTEM FOR MARINE VESSELS

(71) Applicant: ROLLS-ROYCE PLC, London (GB)

(72) Inventors: Maszatul Mansor, Sheffield (GB); Talib E Rajabally, Nottingham (GB); Lily Rachmawati, Singapore (SG)

(73) Assignee: ROLLS-ROYCE plc, London (GB)

( * ) Notice: Subject to any disclaimer, the term of this patent is extended or adjusted under 35 U.S.C. 154(b) by 918 days.

(21) Appl. No.: 16/956,648

(22) PCT Filed: Dec. 12, 2018

(86) PCT No.: PCT/EP2018/084556
§ 371 (c)(1),
(2) Date: Jun. 22, 2020

(87) PCT Pub. No.: WO2019/121237
PCT Pub. Date: Jun. 27, 2019

(65) Prior Publication Data
US 2021/0125502 A1 Apr. 29, 2021

(30) Foreign Application Priority Data
Dec. 22, 2017 (SG) .............. 10201710749P

(51) Int. Cl.
*G08G 3/02* (2006.01)
*G05D 1/02* (2020.01)
(Continued)

(52) U.S. Cl.
CPC ............. *G08G 3/02* (2013.01); *G05D 1/0206* (2013.01); *G06N 3/08* (2013.01)

(58) Field of Classification Search
CPC ........... G08G 3/02; G05D 1/0206; G06N 3/08
See application file for complete search history.

(56) References Cited

U.S. PATENT DOCUMENTS

2008/0033648 A1* 2/2008 Kelly .................. G08G 5/04
701/301
2012/0271538 A1 10/2012 Lee et al.
(Continued)

FOREIGN PATENT DOCUMENTS

| KR | 2016-0129212 A | 11/2016 |
| KR | 2016-0129213 A | 11/2016 |
| WO | 2004/053814 A1 | 6/2004 |

OTHER PUBLICATIONS

Apr. 3, 2019 International Search Report issued in International Patent Application No. PCT/EP2018/084556.
(Continued)

*Primary Examiner* — Charles J Han
(74) *Attorney, Agent, or Firm* — Oliff PLC

(57) ABSTRACT

A collision avoidance method for a water-based vessel, including: obtaining real time data relating to the path of two or more vessels; identifying a collision risk between the two or more vessels; determining if the collision risk is above a predetermined threshold, wherein when the collision risk is above the predetermined threshold, determining one or more collision avoidance manoeuvres on the basis of historical navigational data which corresponds to the real-time data; providing the one or more collision avoidance manoeuvres to an operator of the one or more vessels.

17 Claims, 5 Drawing Sheets

(51) Int. Cl.
*G06N 3/08* (2023.01)
*G05D 1/00* (2006.01)

(56) References Cited

U.S. PATENT DOCUMENTS

| | | |
|---|---|---|
| 2017/0284808 A1 | 10/2017 | Saito |
| 2017/0287340 A1 | 10/2017 | Suzuki et al. |
| 2018/0201348 A1* | 7/2018 | Delay ................... G08G 3/02 |
| 2018/0286258 A1* | 10/2018 | Derbanne ............... G01S 19/15 |

OTHER PUBLICATIONS

Apr. 3, 2019 Written Opinion issued in International Patent Application No. PCT/EP2018/084556.

* cited by examiner

COLLISION AVOIDANCE METHOD AND SYSTEM FOR MARINE VESSELS

CROSS-REFERENCE TO RELATED APPLICATIONS

This specification is based upon and claims the benefit of priority from Singapore patent application number SG 10201710749P filed on 22 Dec. 2017, the entire contents of which is incorporated herein by reference.

BACKGROUND

Field of the Disclosure

The present disclosure provides a system and a method of collision avoidance for marine vessels. The system and method may be utilised by manned, remotely operated or autonomously controlled marine vessels.

Collision avoidance of water-based vessels is a long recognised issue and there are many procedural, legislative and technical systems in place and under development which seek to minimise the risk of collisions between marine vessels.

The International Regulations for Preventing Collisions at Sea 1972, COLREGS, published by the International Maritime Organization, IMO, provide operating rules to be followed by water-based vessels to help prevent collisions between two or more vessels. COLREGS are legally enforceable within maritime jurisdictions and are supported by legal precedents and case law which provide judicial interpretation. Even so, the COLREGS and supporting jurisprudence cannot feasibly prescribe a precise response to all situations and are not absolutely fail safe, hence the requirement for more sophisticated systems.

Description of Related Art

One widely used collision avoidance system uses the automatic identification system, AIS, which requires marine vessel information such as position, course and speed to be provided by VHF equipment for sharing on a common platform viewable by others. AIS is primarily used by vessel crew and shore authorities to monitor vessel movements and thus assist with collision avoidance. Vessels fitted with AIS transceivers can be tracked by AIS shore-based stations or satellites. AIS is a mandatory system for many vessels including passenger vessels and those above a certain tonnage. AIS was first mandated in the early 2000s and a large amount of data relating to ship movements has been gathered in that time. AIS systems are typically used with GPS systems and may be supplemented by traditional radar. Other vessel monitoring systems exist.

WO2004053814A1 describes a collision avoidance system for three or more vessels and includes a path prediction engine to predict the future position of each vessel. A conflict detection engine is used to determine whether any of the vessels are in conflict based on the predicted path. A conflict resolution engine determines a course of action for any vessels determined to be in conflict. The conflict resolution engine includes a genetic algorithm which is used to search for an optimum solution for a given solution space, with an artificial neural network employed to rank each solution. The solutions provided by the resolution engine are based on COLREGS information or knowledge provided by experienced mariners. The artificial neural network, ANN, may benefit by providing feedback from the environment to the ANN. Historical outputs from the ANN may be retained and used to refresh the system.

KR20160129213A describes a collision avoidance system which takes into account the COLREGS when providing an evasion route, displaying the generated route to the ship being diverted and relaying information about the collision avoidance event to the ship being avoided.

US2017284808A1 describes a system for determining whether or not a vessel is taking collision avoidance measures by dividing a water region into a grid, and monitoring the angles of entrance and exits of vessels moving through the grid.

KR20160129212A describes a collision avoidance system which will generate and display to an operator a collision avoidance route when the system determines that a calculated collision risk exceeds a predetermined threshold value.

A complicating factor to maritime collision avoidance is the desire for autonomous vessels which have a limited number of crew, possibly zero, and which rely at least in part on autonomous navigation and control. Here, collision avoidance and the operational codes and systems which are typically governed by experienced seafarers need to be replaced with reliable alternatives that can work in tandem with traditional manned vessels.

This invention seeks to provide an improved collision avoidance system and method for use on a water-based vessel, in particular an autonomous water based vessel.

SUMMARY

The present invention provides a collision avoidance method, a collision avoidance system, a computer program, and a non-transitory computer-readable storage medium.

The collision avoidance method is for a water-based vessel and may comprise: obtaining real time data relating to the path of two or more vessels; identifying a collision risk between the two or more vessels; determining if the collision risk is above a predetermined threshold, wherein when the collision risk is above the predetermined threshold, determining one or more collision avoidance manoeuvres on the basis of historical navigational data which corresponds to the real-time data; providing the one or more collision avoidance manoeuvres to an operator of the one or more vessels.

The determination of the collision avoidance manoeuvres may be provided by a model having an input of the real-time data and an output of the one or more collision avoidance manoeuvres wherein the outputs are provided by model parameters defined using historical navigation data in which a collision risk between two vessels reduces.

Determining the collision risk for the historical navigation data may include filtering the historical navigation data to identify trajectory pairs in which there is a reduction in the collision risk.

Providing the collision risk filtering of the historical navigation data may include obtaining one or more of: the closet point of approach, time to closest point of approach and distance to closest point of approach for vessel pairs in the historical navigation data.

The historical vessel journeys in which there is a reduced collision risk may be segmented to provide relevant journey portions. The co-ordinates of the relevant journey portions may be transformed to have vessel-centric coordinates. The historical navigation data may be normalised with respect to vessel manoeuvrability.

The one or more vessels may include an own vessel and one or more target vessels. The method may further comprise: determining one or more counter-navigation for the target vessels in response to the one or more collision avoidance manoeuvres.

The one or more counter-navigation may be determined prior to providing the one or more collision avoidance manoeuvres to an operator of the one or more vessels.

The counter-manoeuvres may be determined using historical navigation data in which a collision risk increases or decreases in response to a manoeuvre of another vessel.

The counter-manoeuvres may be determined using historical navigation data in which a collision risk increases or decreases in response to a manoeuvre of another vessel.

The collision avoidance method may further comprise: determining a new collision risk using a first collision avoidance manoeuvre and a corresponding first counter-manoeuvre; determining whether the new collision risk is below a new collision risk threshold and selecting the first collision avoidance manoeuvre if the new collision risk is below new collision risk threshold.

The navigational data is obtained from historical navigation tracking data in which one or more of the speed, heading, path, and manoeuvrability are provided.

The historical navigation tracking data may include one or more of: automatic identification system data, long-range identification and tracking data, historical weather/sea state data, incident reports, simulation data, local geography and sea lanes.

The collision avoidance method may further comprise determining the vessel manoeuvrability of one or more of the vessels in the real-time data or historical data.

The vessel manoeuvrability may be determined using vessel characteristics and sea-state data. Either or both of the vessel characteristics and sea-state data may be taken from the historical navigation data. The model may be an artificial neural network or polynomial expression.

The predetermined threshold may include sub-thresholds and the collision avoidance manoeuvres are provided by one of the sub-thresholds, a further sub-threshold resulting in a COLREGS collision avoidance manoeuvre on the basis of COLREGS compliance only.

The collision avoidance manoeuvres are determined at incremental time intervals. The real time data is provided at incremental time intervals. The time intervals are determined by existing time intervals provided in the historical navigation data. The collision risk is determined using the vessel manoeuvrability and the vessel manoeuvrability is determined using vessel characteristics and sea-state data. Either or both of the vessel characteristics and sea-state data may be taken from the historical navigation data.

Also disclosed is a collision avoidance method for a water-based vessel, comprising: obtaining real time data relating to the trajectory of two or more vessels; identifying a collision risk between the two or more vessels; determining if the collision risk is above a predetermined threshold; where the collision risk is above the predetermined threshold providing one or more collision avoidance manoeuvres for one of the two or more vessels, wherein providing the collision avoidance manoeuvres includes: comparing the real time data of the two or more vessels to historical real-time data from a plurality of historical vessel journeys; assessing which of the historical vessel journeys include portions which correspond to the determined collision risk; determining which of the portions of historical vessel journeys included risk reducing manoeuvres which resulted in reduced collision risks; and, outputting the risk reducing manoeuvres as the one or more collision avoidance manoeuvres for the one or more vessels.

Also disclosed is a collision avoidance system may comprise at least one processor; at least one memory comprising computer readable instructions; the at least one processor being configured to read the computer readable instructions to cause performance of the collision avoidance method.

Additionally, there is disclosed a computer program that, when read by a computer, may cause the performance of the collision avoidance method and a non-transitory computer readable storage medium comprising computer readable instructions that, when read by a computer, may cause performance of the collision avoidance method.

BRIEF DESCRIPTION OF THE DRAWINGS

Embodiments will now be described by way of example only, with reference to the Figures, in which.

DETAILED DESCRIPTION OF THE DISCLOSURE

Figure 1:
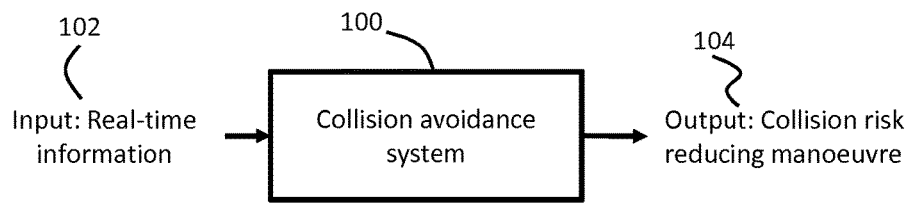
FIG. 1 provides an overview of a collision avoidance system.

FIG. 1 shows a block diagram providing an overview of the collision avoidance system. The collision avoidance system 100 is envisaged to be implemented in situations where there are two or more vessels within a given operational envelope. The operational envelope will be determined by local circumstances and a predetermined size in which a collision risk is a considered a factor. Hence, the vessels may be on the open-water, or restricted by the shore or other features.

The implementation of the method may be carried out on any one or more of the vessels in question, or in one or more shore-based systems. In one example, there may be two ships within a predetermined distance of one another as provided by AIS or radar data. One or more of the vessels may be autonomous having a relatively small number of on-board crew, potentially zero, and possibly one or more shore-based remote operators. The vessels may be any size and type and may include, for example, ocean going cargo vessels, passenger vessels, fishing trawlers or tug boats amongst others.

Each of the elements of FIG. 1 will be expanded upon below, but generally, the collision avoidance system 100 receives various inputs 102 which are duly processed to provide a required output 104. The inputs 102 may include real-time information. The real-time information may relate to two or more vessels and the local environment. The vessel and environment information may be real-time and represent a live or recent situation in which the risk of a collision is possible and assessable.

The vessel information may relate to a first or own vessel which is the principal subject of the collision avoidance method, or a second or target vessel which provides the collision risk. It will be appreciated that the own vessel may carry out or have the collision avoidance method carried out remotely and on its behalf by a third party, for example a remote operator in the case of an autonomous vessel.

The collision avoidance system 100 may include a consideration of the collision risk, a way to reduce the collision risk by providing one or more manoeuvres, and optionally, by considering potential response manoeuvres of target vessels. The target vessel may be a primary target vessel which is the main consideration in the collision risk, or may be a secondary target vessel which is in the vicinity of the own or primary target vessel and may provide a further present or future collision risk.

The output 104 from the collision avoidance system 100 will typically include one or more recommended or mandated actions which are advised or required to reduce the collision risk, ultimately with a view to avoiding a collision. Such outputs may include a change in trajectory implemented by a change in heading or speed, or both.

The collision avoidance system may include one or more collision avoidance model. The decision to run the collision avoidance model may be triggered using a limit/threshold which assesses the risk of collision vs a predetermined acceptable value.

The inputs 102 to the system 100 may include real-time vessel data from the two or more vessels and vessel manoeuvrability for the two or more vessels. The vessel manoeuvrability may be available to the collision avoidance system 100, determined or assumed from available information.

The vessel data may be any available data which allows the collision risk to be assessed but will generally include a current (or relevant recent) position, speed and heading. Such information may be provided by radar, AIS, GPS or a similar system or other means of communication (e.g. transmitted via a vessel communications platform). Vessel data may be known from vessel-based systems and/or general knowledge of the vessel or vessel type.

The environmental information may include sea-state, local weather conditions and navigational restrictions which may exist due to local geography, local rule based constraints (for example defined shipping lanes), or planned routes, amongst others.

Vessel manoeuvrability may be considered within the method and may help to determine the collision risk, the operating envelope and potential trajectories available within a given time frame. The vessel manoeuvrability may be affected by inherent vessel characteristics such as the vessel type, size, draft, and whether it is being manually piloted or is under automated control. Environmental conditions such as the sea-state and geographical location may also be a consideration for the vessel manoeuvrability.

The manoeuvrability of the vessel may be readily available from information accessible by the entity running the collision avoidance system, for example, from AIS data which includes a unique vessel identification number from which vessel characteristics may be obtainable.

In the instance where the manoeuvrability of the vessel is unknown, then other indicators may be used to calculate the manoeuvrability. Such indicators may include historical data for the vessel such as speed and turning circles on the same or other voyages or via visual indicators which may reveal the type of vessel and draft. In some instances, the manoeuvrability of the vessel may be determined using historical data for a particular vessel, for example AIS data, in combination with the real-time sea-state data.

In some instances, the manoeuvrability may be calculated using a model which uses historical AIS data and historical sea-state data to determine what the manoeuvrability of a particular vessel might be. The vessel manoeuvrability may be provided as a worse-case scenario from the available vessel data.

The real-time vessel data may be provided by any suitable source. One particularly suitable real-time vessel data is provided by AIS which is readily available and required on many seafaring vessels. Other vessel data may be available. Other vessel data sources may include ARPA (Automatic Radar Plotting Aid), or MARPA (Miniature Automatic Radar Plotting Aid) systems as are well-known in the art.

AIS data will typically provide vessel information such as position, speed, and navigational status at regular time intervals. The information is obtained from internal vessel systems such as a global navigation system and a gyrocompass, for example. AIS data may be displayed on a suitable device such as chart plotter which shows vessel positions in a similar vein to a radar although other methods exist. In the case of an automated collision avoidance system, the AIS data may be used as an input to a suitable model which can extract the required data. It will be appreciated that the specific information which is available from the AIS data may vary according to the type of vessel which is providing it and or the operators compliance to the rules The current sea-state may be obtained via local observation or monitoring systems, or via a centralised system weather provider such as the European Centre for Medium-Range Weather Forecasts, ECMWF. The vessel state may be used to determine one or more of: a true wind speed and direction from apparent wind speed and direction vessel speed over ground; wave height and period from vessel pitch, roll and yaw; and, current from the vessel speed through the water/heading and speed over ground/course over ground.

Sea lanes may be obtained from sea charts or maps and may be useful in determining a probable predicted path for one of the two or more vessels.

In some instances a specific route plan and/or trajectory may be available or obtainable from received data, such as the AIS data. For example, it may be possible to obtain a trajectory using historical AIS data using the tracking AIS data for a period of time. In real time, the AIS may inform of the destination port, speed, course and heading but not the specific route plan or trajectory. A projected route may be predicted on the basis of current trajectory and/or historic behaviour of a vessel.

Figure 2:
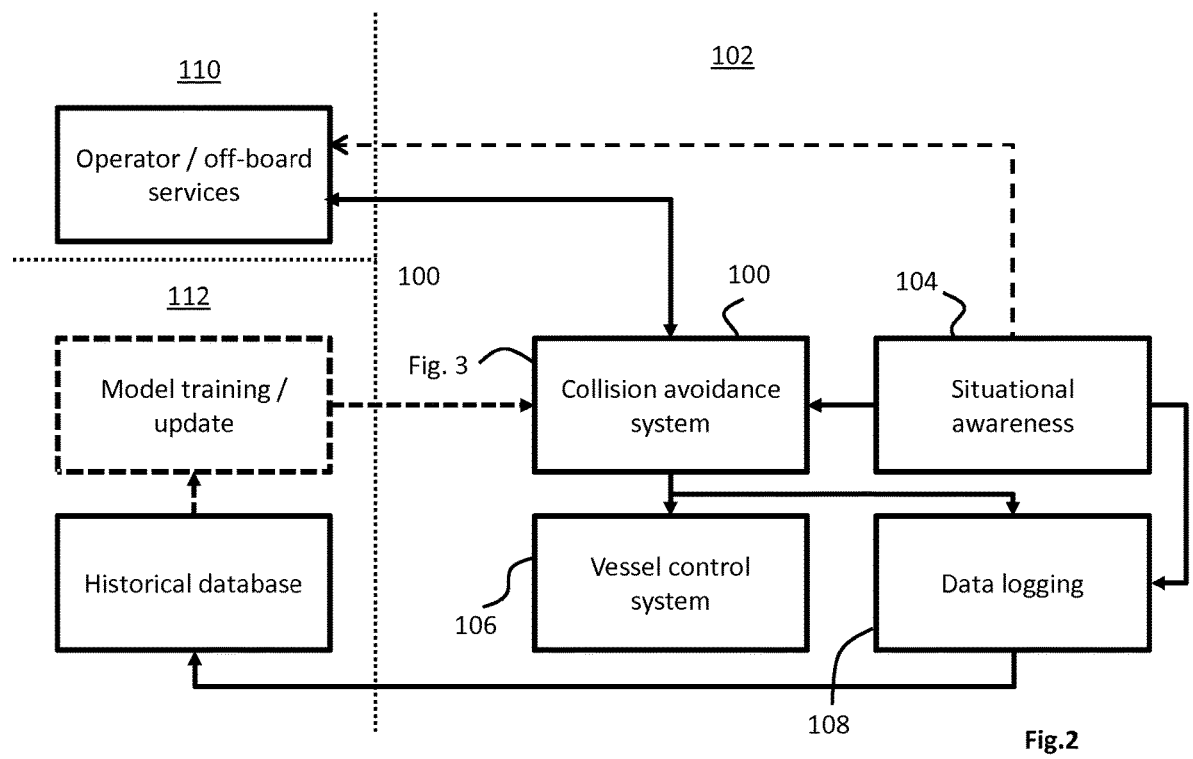
FIG. 2 provides an overview of an operational environment of the collision avoidance system.

FIG. 2 shows the different aspects of a collision avoidance system 100. The collision avoidance system may include elements which are carried out on or on behalf of an own vessel and elements which are carried out 'offline'. The offline aspect relates in part to the training of a model which may be used to determine a collision risk and a collision avoidance strategy. The collision avoidance strategy may include a collision avoidance calculation for the own vessel and a consideration of one or more target vessels. Thus, the collision avoidance calculation may include one or more models. The models may be so-called machine learnt, or machine trained models. Each of the models may use historical data as a way to provide a collision risk reducing recommendation for the own vessel.

The historical data may include historical vessel navigations in which there were collision risks which correspond to the real-time situation. The outcomes of the relevant historical vessel navigations may be used to determine what actions would constitute a collision risk reducing manoeuvre for the real-time situation.

The historical data may also be used to provide a model for determining the reactive movements of the one or more target vessels in light of the real-time situation or action of the own vessel as proposed by the collision avoidance system.

Thus, in FIG. 2, there is shown the on-board vessel systems 102 on the right hand side which may include the collision avoidance system 100 or a part thereof, a situational awareness 104 capability which may include various on-board systems to detect or receive information relating to the real-time situation, one or more vessel control systems 106 which control the operation and manoeuvring of the vessel and some memory or data logging 108 provisions. These systems, with the exception of the collision avoidance system 100 described herein, may be, individually, similar to those well known in the art.

The remote operator 110 shown on the left hand side of FIG. 2 may be shore based and may act on behalf of the vessel and or other vessels in the area. Alternatively, the operator 110 may be on-board a vessel. Thus, the larger system may relate to an autonomous vessel which is controlled remotely. As such, the remote operator may include some of the aforementioned systems such as the collision avoidance system 100 or part thereof, and the data logging capacity 108, with the vessel providing sensory information relating to the situational awareness, and vessel control systems which are subject to external commands issued by the remote operator 110. The remote operator 110 may be offshore in some instances.

The model training and maintenance will typically be done offline and off-board 112, possibly at a remote operator centre or elsewhere. The model may be updated remotely to the vessel, the remote operating centre or may be carried out via a remote connection such as a wired or wireless link. The model training is described in more detail below but will typically require access to some form of database which provides the necessary historical vessel navigation and environmental data. The database and model may use the information provided by the vessel (or remote operator) data logging. Again, the data log may be stored and accessed remotely.

Figure 3:
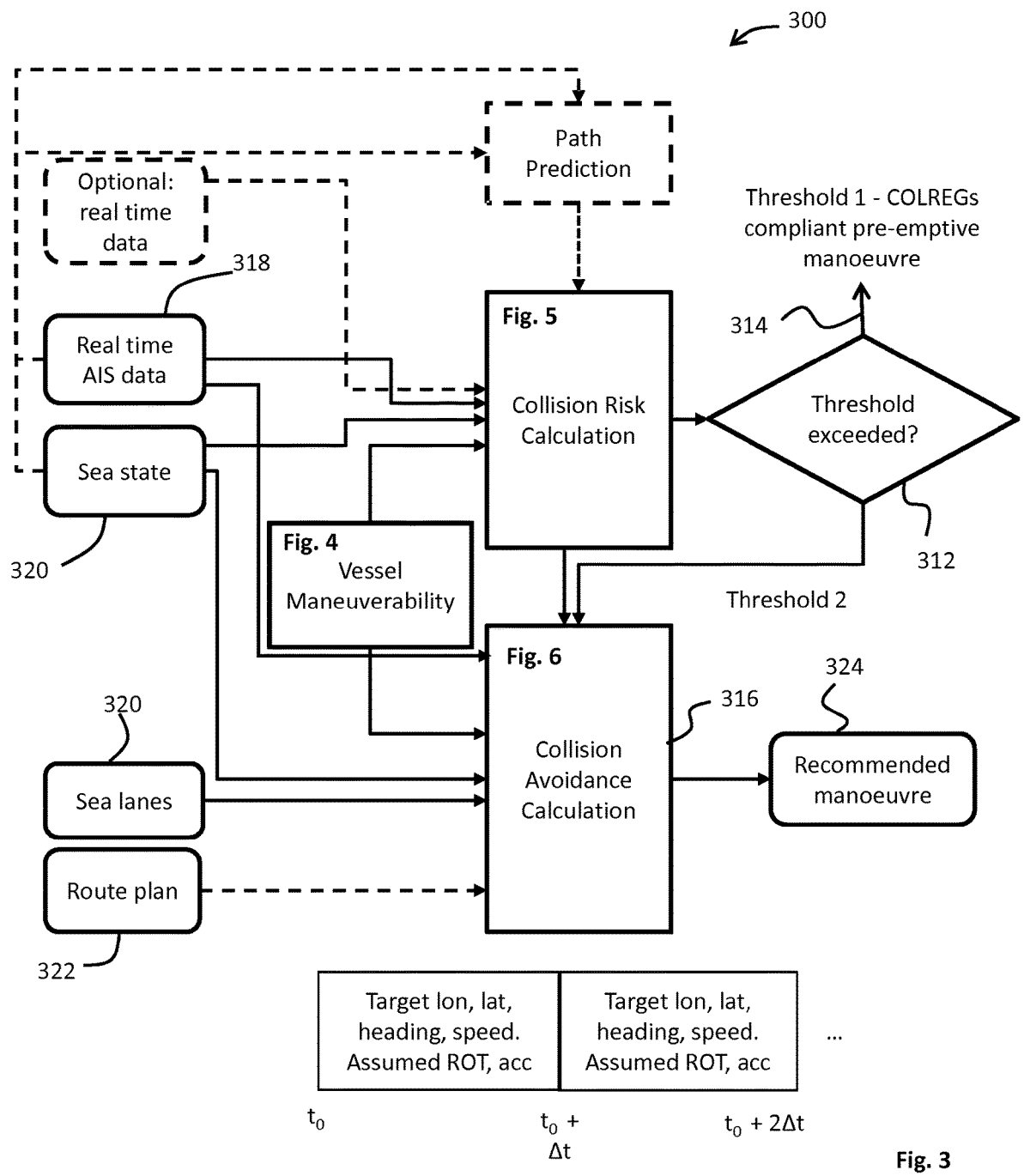
FIG. 3 illustrates an example of a collision avoidance system.

FIG. 3 shows a collision avoidance system 300 in more detail. The collision avoidance system 300 may be used as part of the systems shown and described in relation to FIG. 2, or in an alternative system.

The collision avoidance system 300 may include a vessel manoeuvrability calculator (an example of such being shown in FIG. 4), a collision risk calculator (an example of such being shown in FIG. 5), a collision avoidance calculator (an example of such being shown in FIG. 6) and several inputs and one or more outputs as described herein as required. It will be appreciated that the collision risk calculation and collision avoidance calculation may be carried out by state of the art apparatus which have been configured to carry out the method for each, and may be carried out remote from one another and in different systems. For example, the collision risk calculation may be carried out by a remote operating centre or a watching station which monitors a particular area and a warning signal provided to the own vessel indicating a collision risk has been identified. In some embodiments, the collision risk calculation may be carried out on-board to reduce the impact of a potential communications failure.

Vessel manoeuvrability may be determined from the characteristics of the vessel alone. However, the actual vessel manoeuvrability will be impacted by the conditions in which the vessel is being operated. Thus, in the described example, the vessel manoeuvrability calculation is provided to identify the manoeuvrability of a particular vessel for a particular sea-state condition.

The vessel manoeuvrability calculator may define minimum and maximum speeds, acceleration and deceleration and rate of turn for a target vessel. Additionally or alternatively, the calculation could be carried out for the own vessel where the own vessel is operating in a particular sea-state which may affect the manoeuvrability in an unforeseen way. That is, it is typically expected that the manoeuvrability of the own vessel would be known but may require some adjustment to account for local sea-state or some other manoeuvrability affecting condition.

Figure 4:
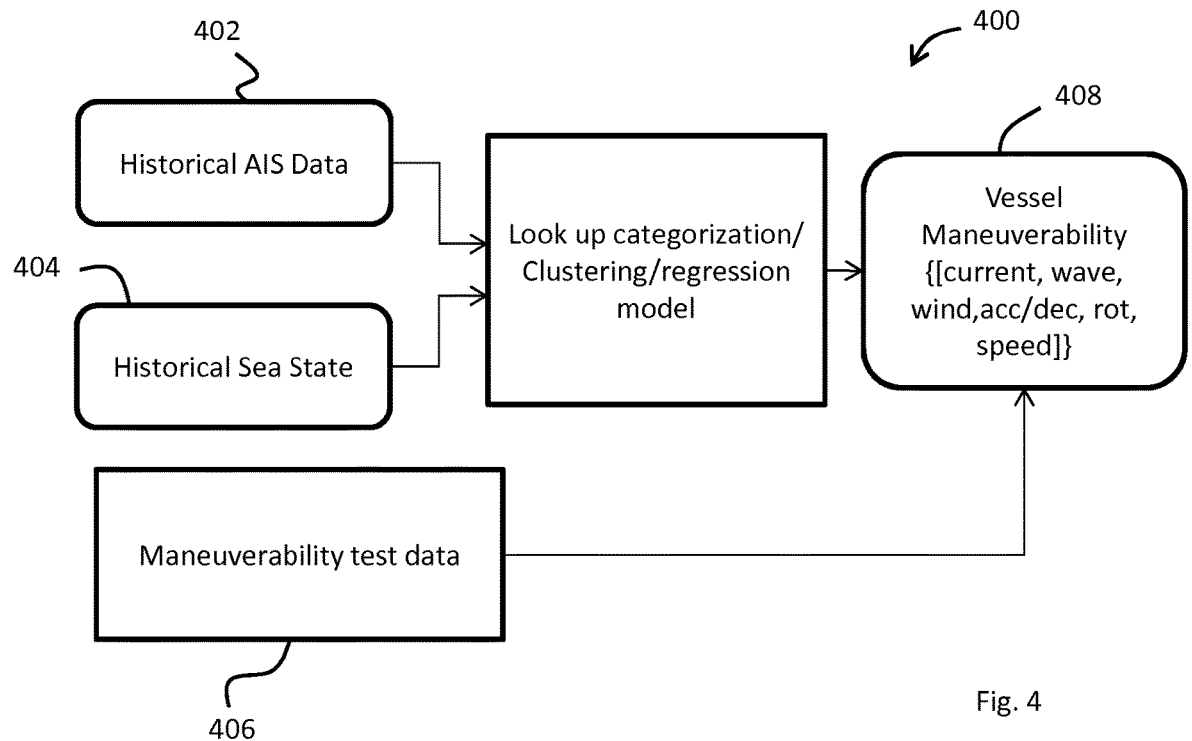
FIG. 4 shows an example of a model for determining vessel manoeuvrability.

FIG. 4 shows a vessel manoeuvrability calculation 400 in which historical vessel data 402 and historical sea-state data 404 is used to provide the manoeuvrability of a vessel 408 in question. The vessel manoeuvrability calculation is typically carried out when the manoeuvrability of the vessel is not known or needs to be adjusted for a particular sea-state.

The historical vessel data 402 may include vessel characteristics such as the type of hull, rudder, engines and manner of control (such as autopilot) and may be provided with contemporaneous historical sea-state data such that the vessel manoeuvrability for a particular vessel characteristic set operating in a particular sea-state or perhaps a geographical location may be mapped.

The determination of the manoeuvrability from the historical data 402, 404 will be dependent on the amount and quality of the data available. Hence, if there is little accessible data, the data which is available may be categorised into a given weather type. So for example the manoeuvrability determined on the basis of the vessel characteristic and 'good', 'fair' or 'poor' weather. Alternatively, if a large reliable data set is available, the sea-state may be provided to a regression model which could provide a prediction of specific manoeuvrability in a given sea-state. The specific manoeuvrability may include a predicted possible speed, acceleration, deceleration, and rate of turn for example. In another example, the vessel manoeuvrability may include a clustering of historical data in which data types are automatically categorised.

Another approach to determining the manoeuvrability of a vessel may be achieved with test data 406 provided by the vessel manufacturer for certification purposes or the like. This manoeuvrability test data may include specific manoeuvrability characteristics for a vessel. The manoeuvrability test data may require some adjustment to account for weather conditions or performance degradation so may be used alone or in combination with other manoeuvrability data as provided for herein or elsewhere.

Figure 5:
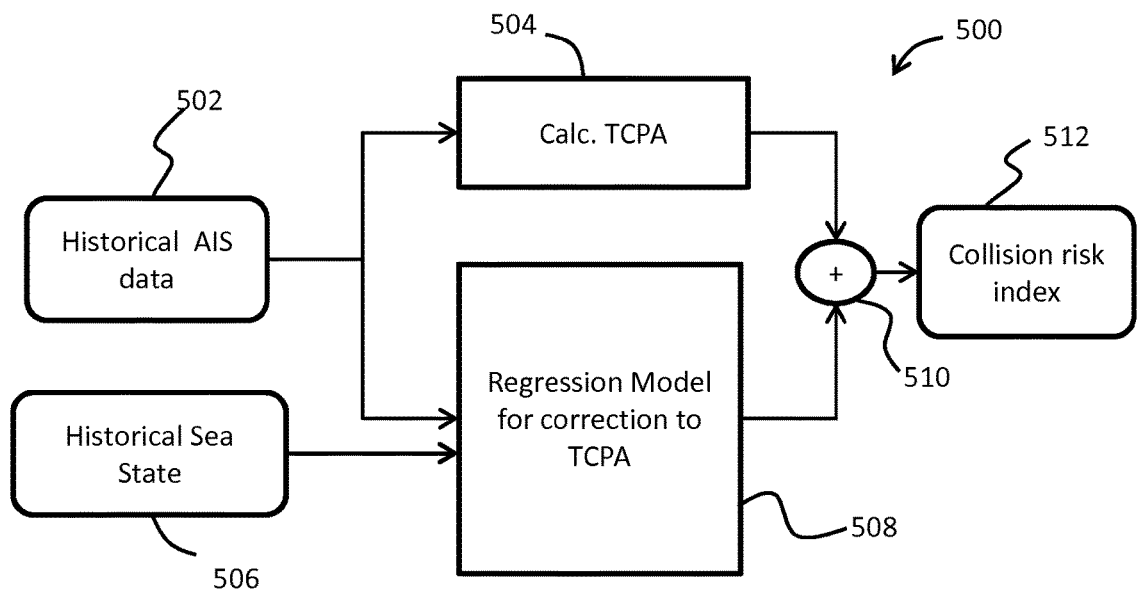
FIG. 5 shows an example of a model for determining the collision risk of two or more vessels.

The collision risk assessment 500 as shown in FIG. 5 determines whether the collision risk is high enough to warrant the own vessel and/or another of the vessels identified in a situation to take evasive action. The collision risk assessment may trigger the collision avoidance calculation when a predetermined threshold/limit is reached or exceeded.

As will be appreciated, the evasive action required in light of a particular level of collision risk will vary depending on the circumstances. In some cases, a minor evasive manoeuvre in line with standard COLREGS navigation may be required, in which case an early manoeuvre may have minimal impact on a voyage overall. However, if action is delayed the collision risk may increase and a more severe evasive manoeuvre may be required. Such evasive actions may include a change in trajectory of the own vessel by altering one or more of a change of direction or a change in speed, perhaps to a dead stop, or by hailing the target vessel if they are required to undertake a corresponding manoeuvre.

As such, the predetermined threshold may be selected as required and the threshold may include sub-thresholds or limits denoting different responses from the collision risk assessment. In some instances, the collision risk assessment may deem that a collision could be possible within an extended time frame, say sixty minutes, or under certain conditions, in which case a basic collision avoidance manoeuvre could be elected.

It will be appreciated that the predetermined threshold will be set in accordance with known practices and may depend on one or more of the local conditions, the vessel manoeuvrability and the type of collision risk assessment carried out.

The collision risk assessment can be achieved using any suitable known system or technique. Such systems or techniques may include Closest Point of Approach, CPA, Time to Closest Point of Approach, TCPA, or Distance to Closest Point of Approach, DCPA. CPA, TCPA and DCPA are well known in the art and several algorithms exist which may be suitable for the present purposes. The tracking data required for these systems can vary but can typically be provided by AIS, ARPA (Automatic Radar Plotting Aid), or MARPA (Miniature Automatic Radar Plotting Aid) system and indicates when two or more vessels (or a single vessel and a stationary object) reach a point where a collision is inescapable.

Many of the standard collision risk calculations do not include potentially collision relevant factors. Hence, the collision risk assessment may advantageously be adapted to include vessel data and environmental data. Thus, the collision risk assessment may be adapted to account for real-time factors which may affect the collision risk in a given scenario.

The historical data may relate to one or more of a: historical vessel data including one or more of a vessel type, speed, heading, rate of turning, route, speed, and historical sea state. Thus, in a scenario where a target vessel manoeuvrability may not be determined from the available vessel data but its type identified, by, for example, observation, historical data may be used to determine the manoeuvrability on the basis of the identified vessel type as it appears in the historical data.

Where historical data is used to determine the collision risk calculation, it may be desirable to include historical sea-state data in the calculation. As will be appreciated, the sea-state may affect the manoeuvrability of a vessel and the collision risk calculation. Thus, the collision risk calculation for a target vessel may be adjusted using historic sea state data.

The historical data may be provided from any known source. For example, the source may include AIS. The use of the historical data in this way, may allow the collision risk index to be adapted on previously recorded effects.

Additionally or alternatively, the vessel data may be provided by real-time data, particularly for the own vessel where manoeuvrability and current sea state are known.

In the example of FIG. 5, the model considers historical AIS data 502 for one or more target vessels and provides the data to a collision avoidance calculation in the form of a TCPA calculation 504. The historical vessel data 502 may additionally be provided with contemporaneous historical sea-state information 506 to a collision risk correction 508. The correction calculation may provide a correction 510 to the collision risk such that it may be adjusted/corrected for sea state conditions which occurred at the time of the historic vessel data. Thus, when used in a real-time, the model can more accurately predict the collision risk for particular types of vessels or vessel characteristics in particular sea-state conditions on the basis of corresponding historical data.

The correction model may be any suitable model as known in the art. For example, the model may be a regression model.

The output of the collision risk calculation is a level of collision risk/collision risk index 512. The collision risk index 512 may be any suitable index as known in the art, such as the aforementioned CPA, TCPA or DCPA. Alternatively or additionally, a modified collision risk index which is adapted for local geographical and/or sea-state factors may be used. It is to be noted that when two or more risk indicators are used the collision avoidance calculation may be triggered using only one of the triggers.

Returning to FIG. 3, the collision risk index 512 is assessed against a predetermined threshold 312 to determine whether it has been exceeded and thus whether a collision avoidance manoeuvre may be needed. The collision risk threshold may be predetermined in accordance with known good seamanship. There may be one or more threshold limits. The multiple threshold limits may each be set according to a desired output from the collision avoidance system. Outcomes may include one or more of: starting collision avoidance calculations, recommending one or more collision avoidance actions, mandating one or more collision avoidance actions, providing a warning to one to more vessel operators of the own or target vessels and taking evasive action.

For example, a first threshold may provide a lower level warning or begin a collision avoidance calculation running. A second threshold may be indicative of a higher risk situation where evasive action is recommended to reduce a collision risk and or optimise an acceptable route. A third threshold may be used to mandate evasive action to avoid a collision.

A first threshold 314, as shown in FIG. 3, may relate to a lower risk level where a simple, perhaps pre-emptive and low impact action may be appropriate to reduce or remove a collision risk, or perhaps where COLREGS dictates that a manoeuvre is required. In such a case, a manoeuvre may be selected from a rule-based decision system that represents, for example, COLREGS. The rule-based decision may include the use of a look-up table or decision tree for example. In this case, there is no need to undertake the collision avoidance calculation 316 shown in FIG. 3. Typically, the rule-based decision system will be used to ensure there is a compliant solution which could be executed for cases where the machine learnt model solutions are not suitable, for example, if they do not converge.

COLREGS provide navigational rules to help avoid collisions but are only basic rules which require assessment and application to a given scenario by a vessel operator. For example, in a head-on encounter, COLREGS Rules 14 and 16 which require a vessel to alter course to starboard and to do so early and substantially may apply. However, no heading change is specified, nor a time interval in which action should be taken. These decisions are made locally by the mariner. Hence, the low threshold may provide upper and lower bounds for instructed actions which are interpreted using the rule based system. A "back-up" manoeuvre may also be constructed using the rule based system. For example, the heading change may be taken as a medial value between the maximum and minimum threshold. This ensures that there is always a COLREGS-compliant manoeuvre that minimises the collision risk.

A higher risk and associated threshold may be related to the CPA, TCPA or DCPA and represent a level at which the respective criterion exceeds a predetermined acceptable limit and or where there is ambiguity in COLREGS guidance. In such a case, the collision avoidance system may implement a collision avoidance calculation 316.

A collision avoidance calculation 316 requires inputs which relate to a real-time scenario which is the cause of the collision risk threshold trigger, and outputs one or more recommended manoeuvres 324.

The inputs may include one or more of: real-time vessel data 318 and environmental data. The real-time vessel data 318 may include vessel trajectory and vessel manoeuvrability. The vessel trajectory may be provided or determined from positional data as provided by any suitable known system, such as AIS as previously described. The real-time vessel data 318 may include data for two or more vessels including the own vessel and target vessel or vessels.

The environmental data may include sea-state 320, local weather conditions and navigational restrictions 320, 322 which may exist due to local geography, local rule based constraints (for example defined shipping lanes), or planned routes, amongst others.

The objective of the collision avoidance model 316 is to model the navigation behaviour of vessels in successful collision risk reduction scenarios. Thus, a model is trained using historical vessel navigation data prior to being used to provide a solution for a real-time scenario. Generally, the historical data is used to identify prior navigations which have a significant reduction in collision risk, and use those journeys to identify suitable navigation options for reducing collision risks. Providing a model with this information allows real-time scenarios to be mapped against prior collision risk behaviour and thus good practice.

The historical data described below is AIS data, but it will be appreciated that other types or sources of historical data may be applicable. The historical data may include multiple types or sources of data. For example, the historical data may include incident reports capturing previous marine incidents not represented in the chosen primary source of historical data.

Figure 6:
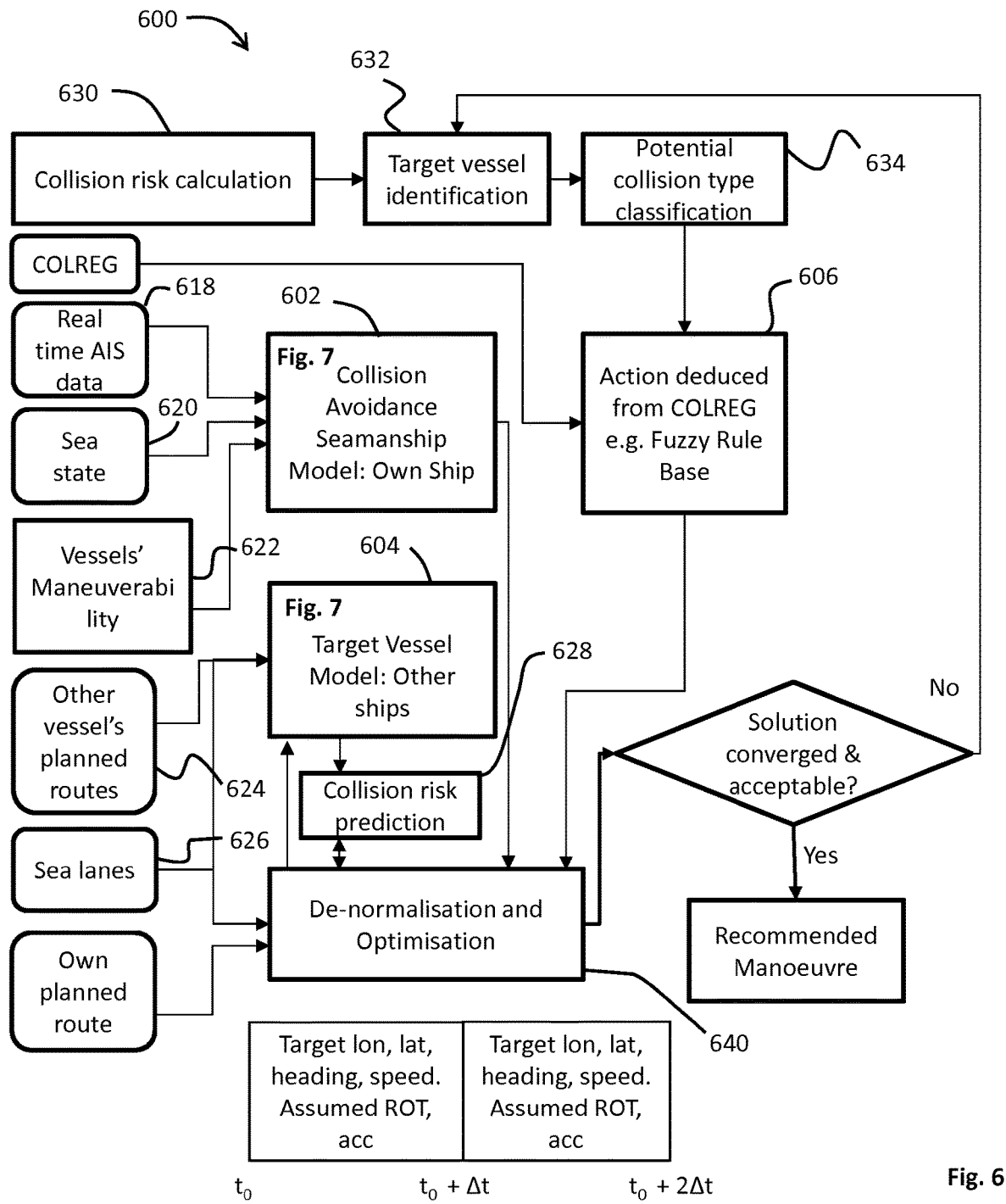
FIG. 6 shows an example of a collision avoidance calculation.

A collision avoidance calculation 600 is shown in FIG. 6. The collision avoidance calculation 600 may include one or more models which map historical data in which a collision risk is detected and avoided to real-time data. The models may include a collision avoidance model 602 which provides one or more own vessel manoeuvres which potentially reduce the collision risk for the own vessel. Another model may be a target vessel model 604 which models the potential manoeuvres of target vessels in response to a proposed own vessel manoeuvre. A COLREGS model 606 may be provided to determine whether a proposed manoeuvre is COLREGS compliant.

The collision avoidance model may have inputs such as real time AIS data 618, sea state 620 and vessel manoeuvrability 622 which may be provided as described above in connection with FIG. 4. The target vessel model 604 may have inputs such as target vessel manoeuvrability, target vessel planned routes 624 and sea lanes 626. Additional inputs may include the local geography including, for example, sea lanes.

Figure 7:
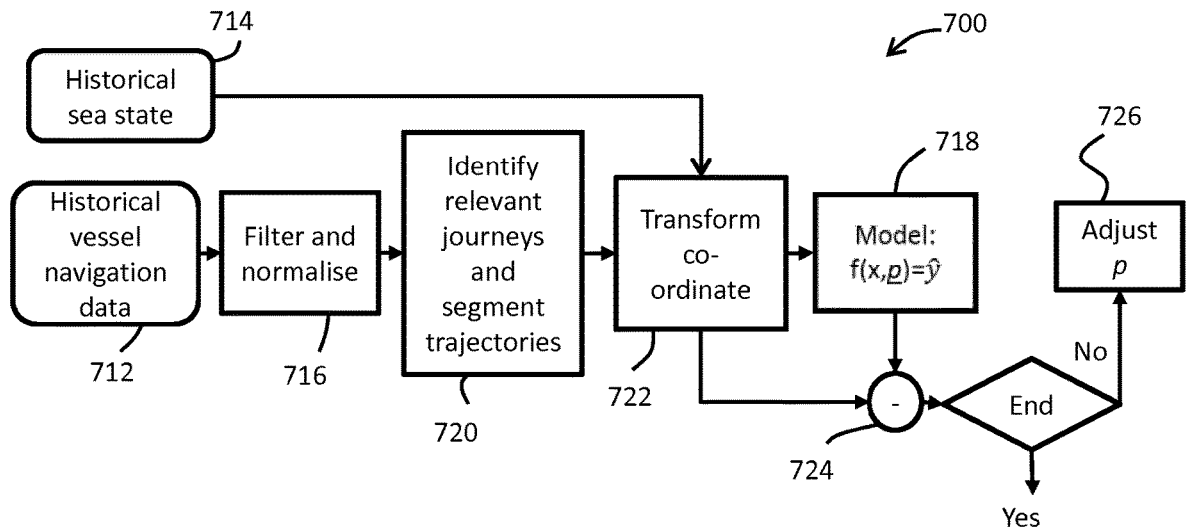
FIG. 7 shows an example of a model which may be implemented as a collision avoidance model or a counter-navigation model.

A collision avoidance model 700 is shown in FIG. 7. The collision avoidance model may include the steps of: providing historical vessel navigation data 712; providing historical environmental conditions 714; filtering the vessel navigation data to identify relevant vessel-journeys 716; normalising the data with respect to the one or more vessel characteristics 716; training a model 718 using the relevant vessel-journeys that fit the navigational actions that result in a reduction of a collision risk.

Filtering the data 716 to identify relevant vessel-journeys may include pre-processing steps to correct or remove spurious, missing or non-relevant portions of data which may affect the model training.

Normalisation of the data may include normalising the speed, heading and rate of turning with respect to vessel manoeuvrability and dimensions. Normalising the data allows the historical navigations to be applicable to different scenarios where the characteristics of the own or one or more of the target vessels are different. The differences, and hence normalisation, may be brought about by varying vessel types and drafts, differences in sea-state conditions and local geography etc. These considerations may be normalised individually or together, for example, by considering the manoeuvrability of the vessel which is affected by each one of these variables.

A general objective of the normalisation is to allow learned behaviour to be applied to different vessel dimensions. The normalization may involve scaling analogous to the operations applied when scaling vessel model tests in tanks to full scale vessel behaviour which is well known in the art. The normalisation may additionally include mapping different vessel design parameters to improve the accuracy of the model.

To enable the model to be trained efficiently and be effective, the historical navigation data may be analysed to identify trajectory pairs 720 within the data where there is a large reduction in the collision risk index. The collision risk index could be provided by CPA, TCPA, DCPA or others.

Identifying the relevant vessel navigations may include segmenting the journeys to isolate relevant portions. The segment of the journey may have a beginning/first point at a predetermined point upstream or local to where the collision risk reduces by a specified amount. The segment may terminate where the navigation is indicative that the historical collision avoidance manoeuvres have terminated and thus, the data can provide no further useful input.

Each segment of vessel journey may include a plurality of sub-segments. That is, the segment of journey may be further segmented. The sub-segments may correspond to time intervals. The time intervals may be determined by the historical data which may be time segmented. For example, AIS data may be provided in two, three or four minute intervals.

Additionally or alternatively, the historical navigations may be segmented to correspond to the required output of the model. Thus, if the model outputs a recommended manoeuvre at a time $t_n$ with a predicted position and collision risk to be achieved by $t_{n+1}$, then the historical data may be segmented to provide $t_{n+2}$ intervals. As can be seen from FIGS. 3 and 6, the collision avoidance calculation, and thus collision avoidance system, provides outputs at time $t_0$, $t_0+\Delta t$, $t_0+2\Delta t$ . . . , where $t_0$ may be the initial position of the own vessel, $t_0+\Delta t$ is a second time interval which has a target location, heading or speed, and $t_0+2\Delta t$ is at third time having a second target location downstream of the initial and first target locations. Here, the model would correspond to the desired output time intervals.

The segments and/or sub-segments may be transformed 722 to provide vessel-centric coordinates. The vessel-centric coordinates may adjust the historical data such that the historical navigation segments and manoeuvres are adjusted to account for relative to the sea-state conditions. Thus the manoeuvres become representative of the required vessel manoeuvre given the sea-state circumstances at a particular time interval, rather than the manoeuvre being related to the ground speed.

The model 718 shown in FIG. 7 is represented as a function $f(x,p)=\hat{y}$, which is created by inputting the relevant processed historical data. The data comprises of both x and $\hat{y}$, where x are the inputs relating to the collision risk profile, and $\hat{y}$ is the set of resultant estimated outputs. The parameters which map the inputs to the output are represented by p.

The model may be any type as known in the art and suitable for the described purpose. For example, the model may be a polynomial function/regression or artificial neural network.

Generally, the input may include but is not limited to current speed, position with respect to the target vessel, route, speed and heading. The output may include but is not limited to a change in speed and change in direction. The model parameters may be coefficients and degree of the polynomial if the model is a polynomial, or, number of layers, number of neurons per layer, connection configuration and connection weights if the model is a neural network.

In training the model, the inputs are provided and a first set of model parameters assumed to provide estimated outputs. The outputs of the model and input coordinates for the next time interval are subtracted at 724 to find the discrepancy between the estimated output of the model 718 and the actual output. For example, the input to the model 718 may be a vessel speed at a first time interval, and the output may be a target speed at a second interval. The output which occurred in the historical data, the actual output, is known from the transform coordinates, whilst the estimated output provided by the model is dependent on the model parameters. The discrepancy between the actual and estimated parameters is an indication of the fit of the model to the data.

The model fitting or training is an iterative process of adjusting the parameters, p, 726 to reduce the discrepancy and/or minimise the discrepancy and/or maximum acceptable discrepancy. The reduction of the discrepancy is typically done with an optimization algorithm as are known in the art for various types of model. The end decision indicates when to stop adjusting the parameters of the model to improve the fit to the training data. The end decision is a binary operation shown as 'yes' or 'no' and may be determined by a maximum number of iterations to train the model.

Where the fit is within a predetermined tolerance the model can be accepted and the training completed. The model is then ready to be utilised in service where the inputs are provided by the real-time data and to provide the outputs using the accepted parameters.

Once the model is trained, it can be tested using historical navigation data inputs which were not used as part of the training data set. Additionally, the model can be tested as part of a simulator or sea trial.

Returning to FIG. 6, the collision avoidance calculation 600 may also include a target vessel model 604. The objective of the target vessel model 604 is to model the navigation behaviour of target vessel or vessels wherein there is a significant change in collision risks, as found in the historical data. Thus, it is the aim of the target vessel model to predict the counter-navigation of the target vessels in response to the proposed own vessel manoeuvre. The navigational model 604 is utilised in scenarios where there are multiple target vessels. It will be appreciated that the collision avoidance model 602 is sufficient where there is a single target vessel of concern because the collision avoidance model 602 will suggest a collision risk reducing manoeuvre in respect of the own and primary target vessel.

The target vessel model 604 may be adapted to determine the target vessel navigation when the risk of collision decreases or increases because of an own vessel manoeuvre. This is in contrast to the collision avoidance model 602 which typically only considers historical navigations in which there was a reduction in the collision risk index. Training the model using historical navigation data where there is an increase in collision risk allows the model to identify proposed own vessel manoeuvres in which there is an increase in the collision risk and thus prevent the model from converging on a solution.

The target vessel model 604 may be adapted to account for multiple vessel situations in congested waters or otherwise which may not be considered by the collision avoidance model which typically only considers an own vessel and one other target vessel.

The training and use of the target vessel model 604 may be similar to the collision avoidance model described above in relation to FIG. 7 and will typically include the steps of: providing historical vessel navigation data 712; providing historical environmental conditions 714; filtering the data to identify relevant vessel-journeys and normalising the data with respect to the one or more vessel characteristics 716; identifying the relevant journeys and segmenting the trajectories 720; transforming the segments to provide vessel-centric coordinates 722; providing a model in the form of a function $f(x,p)=\hat{y}$, which is created by inputting the relevant processed historical data. The data comprises of both x and $\hat{y}$, where x are the inputs relating to the collision risk profile, and $\hat{y}$ is the set of resultant estimated outputs. The parameters which map the inputs to the output are represented by p.

The descriptions of each of these stages and the training and testing may be the same as provided for in the collision avoidance model and will not be repeated here. An exception to this is the relevant historical navigations of interest may be those where there is a change in collision risk, rather than there being a decrease in collision risk. Allowing for a change in collision risk allows the target vessel model to be adapted for situations where the proposed recommended manoeuvre from the collision avoidance model results in an increase of a collision risk. This may be the case where the target vessel is not the first/target target vessel.

Returning to FIG. 6, the output of the target vessel model is provided to a collision risk prediction model 628 in which a collision risk index is provided on the basis of a proposed own vessel manoeuvre, a target vessel manoeuvre and another target vessel manoeuvre which may be taken in reaction to the own vessel manoeuvre. The own vessel manoeuvre may be provided after a de-normalisation step as shown. The de-normalisation is described below. The collision prediction calculation can be carried out in a similar way to the collision risk calculation described above and calculates the respective collision risk for each of the vessels in the scenario with respect to each of the other vessels. As the collision prediction risk and collision risk calculation are similar, the calculation will not be repeated here.

A further step in the collision avoidance calculation is the COLREGS compliant manoeuvre calculation 606. The objective of the COLREGS compliant manoeuvre calculation is to ensure that the proposed manoeuvre meets the COLREGS standard in any particular situation. In order to determine this, the collision risk calculation 630 as described in connection with FIG. 4 is used to identify the target/primary target vessel 632 prior to categorising the collision in line with the collision types 634 addressed by COLREGS. Following this, COLREGS compliant calculation suggests any COLREGS compliant limitations which a recommended manoeuvre must meet. The COLREGS compliant action may be obtained by using a fuzzy rule base, but other methods may be possible.

The collision avoidance model 602, target vessel model 604 and COLREGS compliance manoeuvre calculation 606 may be subject to a de-normalisation step 640. The objective of the de-normalisation is to adjust the output of the collision avoidance model to scale it to the real-time scenario.

The collision avoidance model, target vessel model 604 and COLREGS compliance manoeuvre calculation 606 may be subject to an optimisation process. The objective of the optimisation is to find the range of manoeuvres which fits the output of the collision avoidance model, and minimises the deviation from the own planned route and existing sea lanes, and minimises the overall traffic collision risk, taking into account the predicted response from the other vessels in the vicinity to the own vessel manoeuvre. The optimisation step may include multiple separate algorithms.

Other objectives could also be applied to the optimisation process. For example, the collision avoidance model optimiser may consider vessel health by selecting acceleration that would be less detrimental.

The optimisation algorithm may end when the solution is provided.

The possible manoeuvres provided as an output from the optimisation process may be placed at time intervals from a given real-time scenario. Thus, there may be a first manoeuvre at $t_0$ and followed by a plurality of further manoeuvres at $t_0 \ldots t_n$, each separated by a time interval delta t. Each manoeuvre may be categorised by one or more of a target: speed; a longitude and latitude or heading. The targets may be provided on an assumed rate of turning and acceleration as provided by vessel manoeuvrability calculations.

It will be appreciated that the target vessel model and COLREGS compliant manoeuvre calculation will be subject to the de-normalisation and optimisation so far as they are present in the collision avoidance calculation. There may be instances or collision avoidance systems in which these aspects are not carried out as part of the same collision avoidance model in which case the de-normalisation and optimisation steps will apply only to the collision avoidance model.

The recommended manoeuvre may be one of a plurality of recommended manoeuvres provided to the vessel operator. As described above, the vessel may be manned, remotely operated or autonomous. Hence, for a manned vessel, the recommended manoeuvre may be a provided as a suggestion to the captain or helmsman. Likewise with a remote operator. In the case of an autonomous vessel, the recommended manoeuvre may be provided as an instruction that is executable by the vessel's control system.

Thus, where a solution provided by the model is converged and acceptable, the collision avoidance system may provide a recommended manoeuvre. Additionally or alternatively, the collision avoidance system may provide one or more manoeuvre options. The manoeuvre options may be ranked in order of preference of collision risk reduction. The manoeuvre options may include one or more manoeuvres which increase a collision and which are to be avoided by the navigator.

The presentation of the recommended manoeuvre may vary according to the end user. In one example, the recommended manoeuvre may be presented on a chart plot showing the recommended trajectory and required manoeuvres at the different time intervals, and the expected response from the target vessel(s). Alternatively, or additionally, the recommended manoeuvres may be displayed as a change in trajectory and an associated reduction in collision risk for each manoeuvre. For example, the recommended manoeuvre may be provided as a plain-text readable instruction.

Where the solution is not acceptable because the collision risk has increased due to the output from the collision risk prediction in light of a proposed own vessel manoeuvre, a new primary target vessel is selected and the collision risk prediction re-calculated. This relates to a multiple vessel scenario where avoiding collision with one target vessel increases collision risk with another vessel in the vicinity.

In use, the trained model may be used by a vessel or remote/on-board operator to input the real-time data as described above. The model effectively mapping the real-time data input via the model parameters to provide one or more outputs. The one or more outputs may be time separated manoeuvres.

It will be appreciated that the model may be updated and/or retrained periodically to take account of fresh historical data for example. It may also be desirable to record the recommended manoeuvres and resultant change in the collision risk index and use that to update the model.

The collision avoidance system may be supplemented with a path prediction model which seeks to anticipate collision risk in advance. For example, the path prediction may be used to determine if there was likely to be an increased risk of collision within the next hour. The path prediction may be used to make one or more minor manoeuvre to reduce the collision risk and avoid the need for more costly action at a later time.

In one example, in use, an own vessel detects via radar a vessel within a predetermined radius in which a collision risk exists. The collision avoidance system begins a collision risk calculation taking account of the target vessel's AIS data which provides the necessary data to identify the vessel. The vessel's manoeuvrability is calculated as described in relation to FIG. 4 by utilising the historical AIS data for the vessel and corresponding historical sea state data.

The collision risk index may be at an acceptable level in the first instance so the collision risk system maintains a monitoring function in which the routines are continuously or regularly carried out at specified time intervals.

After a given time, the proximity of the vessels increases and the calculation risk exceeds a predetermined threshold which is indicative that a collision risk is significant enough to warrant evasive action from the own vessel. The exceedance of the collision risk index triggers the collision avoidance calculation which inputs real-time data relating to the own and target vessel trajectories and respective manoeuvrability to the collision avoidance model.

The collision avoidance model is configured as described above and results in one or more output manoeuvres which would result in a reduction of the collision risk. The outputs are de-normalised so as to be applicable to the own vessel's manoeuvrability. In addition to the collision avoidance model, the collision avoidance calculation triggers the COLREGS compliance calculation which categorises the type of collision risk and the permitted COLREGS compliant manoeuvres or trajectory envelope in which the own vessel may move whilst being COLREGS compliant.

In this described example, the target vessel model is also triggered to determine the actions of the two other vessels in the active vicinity of the own vessel. In doing so, the collision avoidance calculation provides the real-time data of the own vessel, the primary target vessel and the secondary target vessel, and one or more of the de-normalised recommended manoeuvres of the own vessel outputted from the collision avoidance model. Also inputted are the target vessel planned routes if available and any applicable sea lanes.

The target vessel model provides predictive reactive manoeuvre's for de-normalisation.

The target vessel model outputs and collision avoidance model outputs are then optimised and to provide converged and acceptable solution. If the solution is acceptable, the one or more recommended outputs may be provided to the vessel operator who may or may not decide to implement one or more of the manoeuvres.

In the following description, the terms 'connected' and 'coupled' mean operationally connected and coupled. It should be appreciated that there may be any number of intervening components between the mentioned features, including no intervening components.

Figure 8:
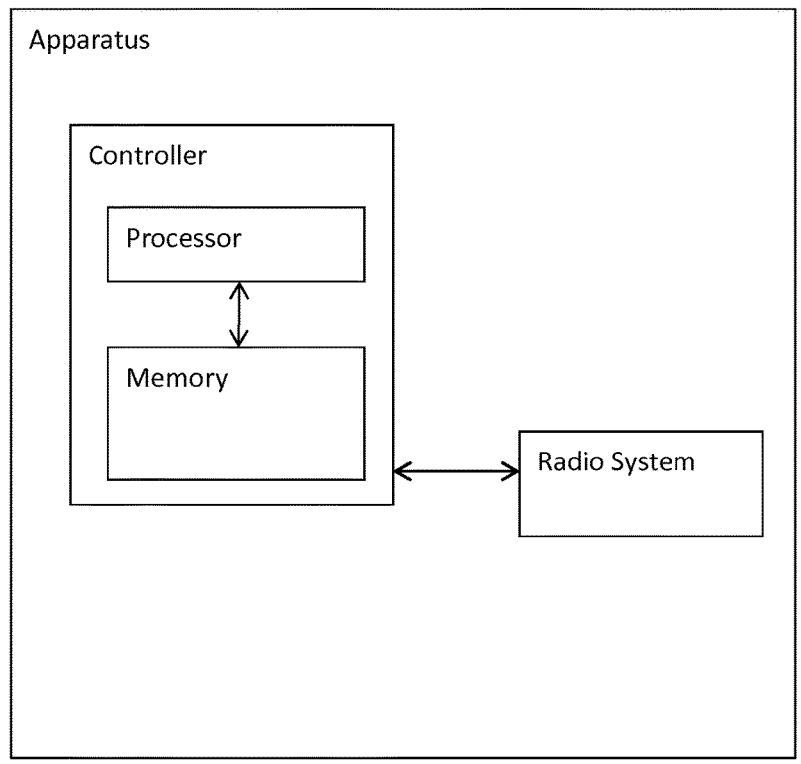
FIG. 8 illustrates an apparatus on which the various models may be trained or executed.

FIG. 8 illustrates a schematic diagram of an apparatus which may be used to train the models described herein, or execute the method. The apparatus may be provided as part of a vessel, an operating centre or elsewhere.

The apparatus may include a controller, a user input device, and an output device. In some examples, the apparatus may be a module. As used herein, the wording 'module' refers to a device or apparatus where one or more features are included at a later time and, possibly, by another manufacturer or by an end user. For example, where the apparatus is a module, the apparatus may only include the controller, and the remaining features may be added by another manufacturer, or by an end user.

The controller, the user input device, and the output device may be coupled to one another via a wireless link and may consequently comprise transceiver circuitry and one or more antennas. Additionally or alternatively, the controller, the user input device and the output device may be coupled to one another via a wired link and may consequently comprise interface circuitry (such as a Universal Serial Bus (USB) socket). It should be appreciated that the controller, the user input device, and the output device may be coupled to one another via any combination of wired and wireless links.

The controller may comprise any suitable circuitry to cause performance of the methods described herein. The controller may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller may comprise at least one processor and at least one memory. The memory stores a computer program comprising computer readable instructions that, when read by the processor, causes performance of the methods described herein. The computer program may be software or firmware, or may be a combination of software and firmware.

The processor may be located on-board or off-board a vessel, or may be distributed between the vessel and a location remote from the vessel. The processor may include at least one microprocessor and may comprise a single core processor, may comprise multiple processor cores (such as a dual core processor or a quad core processor), or may comprise a plurality of processors (at least one of which may comprise multiple processor cores).

The memory may be located on the vessel, or may be located remote from the vessel, or may be distributed between the vessel and a location remote from the vessel. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of a computer program; bulk storage; and cache memories which provide temporary storage of at least some computer readable or computer usable program code to reduce the number of times code may be retrieved from bulk storage during execution of the code. Thus, the memory may be used to store historical data, one or more of the models, local data pertaining to the vessel characteristics, location, sea-state or other relevant information.

The computer program may be stored on a non-transitory computer readable storage medium. The computer program may be transferred from the non-transitory computer readable storage medium to the memory. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory via a wireless signal or via a wired signal.

Input/output devices may be coupled to the system either directly or through intervening input/output controllers. Various communication adaptors may also be coupled to the controller to enable the apparatus to become coupled to other apparatus or remote printers or storage devices through intervening private or public networks. Non-limiting examples include modems and network adaptors of such communication adaptors.

The user input device may comprise any suitable device for enabling an operator to at least partially control the apparatus. For example, the user input device may comprise one or more of a keyboard, a keypad, a touchpad, a touchscreen display, and a computer mouse. The controller is configured to receive signals from the user input device.

The output device may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller is arranged to provide a signal to the output device to cause the output device to convey information to the user.

It should be appreciated that the method(s) described herein may be performed 'offline' on data which has been measured and recorded previously. Alternatively it may be performed in 'real-time', that is, substantially at the same time that the data is measured. In this case, the controller may be coupled to the vessel and may be a vessel control system, communication system or another on-board processor.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

We claim:

1. A collision avoidance method for a water-based vessel, comprising:
    obtaining real time data relating to a path of two or more vessels;
    identifying a collision risk between the two or more vessels;
    determining if the collision risk is above a predetermined threshold;
    when the collision risk is above the predetermined threshold, determining one or more collision avoidance manoeuvres by comparing the real-time data with historical navigational data corresponding to the real time data;
    wherein the determining of the one or more collision avoidance manoeuvres is provided by a model having an input of the real-time data and an output of the one or more collision avoidance manoeuvres, and the outputs are provided by model parameters defined using the historical navigation data in which a historic collision risk between two historic vessels reduces;
    wherein the model is an artificial neural network or polynomial expression; and
    providing the one or more collision avoidance manoeuvres to an operator of one of two or more vessels.

2. The collision avoidance method of claim 1, wherein the determining of the one or more collision avoidance manoeuvres includes identifying two historic vessels having trajectories in which there is a reduction in the collision risk by filtering the historical navigation data.

3. The collision avoidance method of claim 2, wherein the filtering the historical navigation data includes obtaining one or more of: the closet point of approach, time to closest point of approach and distance to closest point of approach for historic vessels, including the two historical vessels, in the historical navigation data.

4. The collision avoidance method of claim 1, wherein the historical navigational data in which there is a reduction in the collision risk are segmented into journey portions.

5. The collision avoidance method of claim 4, wherein the co-ordinates of the journey portions are transformed to have vessel-centric coordinates.

6. The collision avoidance method of claim 1, wherein the historical navigation data is normalised with respect to a vessel manoeuvrability of one or more of two or more historic vessels in the historical navigation data.

7. The collision avoidance method of claim 1, wherein two or more vessels include an own vessel and one or more target vessels, and the method further comprises: predicting one or more counter-navigation manoeuvres with respect to the target vessel when providing the one or more collision avoidance manoeuvres to the own vessel.

8. The collision avoidance method of claim 7, wherein the one or more counter-navigation manoeuvres are predicted prior to providing the one or more collision avoidance manoeuvres to an operator of the own vessel.

9. The collision avoidance method of claim 1, wherein a counter-manoeuvre is determined using the historical navigation data and identifying increases or reductions in collision risks in response to a manoeuvre of another vessel.

10. The collision avoidance method of claim 9, further comprising:
    determining a new collision risk using a first collision avoidance manoeuvre and a corresponding first counter-manoeuvre; and
    determining whether the new collision risk is below a new collision risk threshold and selecting the first collision avoidance manoeuvre when the new collision risk is below the new collision risk threshold.

11. The collision avoidance method of claim 1, wherein the historical navigational data is obtained from historical navigation tracking data in which one or more of: speed, heading, path, and manoeuvrability are provided.

12. The collision avoidance method of claim 11, wherein the historical navigation tracking data includes one or more of: automatic identification system data, long-range identification and tracking data, historical weather/sea state data, incident reports, simulation data, local geography and sea lanes.

13. The collision avoidance method of claim 12, wherein the vessel manoeuvrability is determined using vessel characteristics and sea-state data.

14. The collision avoidance method of claim 1, further comprising determining the vessel manoeuvrability of one or more of two or more vessels in the real-time data or the historical navigation data.

15. The collision avoidance method of claim 14, wherein either or both of vessel characteristics and sea-state data are taken from the historical navigation data.

16. A collision avoidance system comprising:
    at least one processor;
    at least one memory storing computer readable instructions;
    the at least one processor being configured to read the computer readable instructions to:
        obtain real time data relating to a path of two or more vessels,
        identify a collision risk between the two or more vessels,
        determine if the collision risk is above a predetermined threshold,
        when the collision risk is above the predetermined threshold, determine one or more collision avoidance manoeuvres by comparing the real-time data with historical navigational data corresponding to the real time data,
        wherein the determining of the one or more collision avoidance manoeuvres is provided by a model having an input of the real-time data and an output of the one or more collision avoidance manoeuvres, and the outputs are provided by model parameters defined using the historical navigation data in which a historic collision risk between two historic vessels reduces;
        wherein the model is an artificial neural network or polynomial expression; and provide the one or more collision avoidance manoeuvres to an operator of one of the two or more vessels.

17. A non-transitory computer-readable storage medium storing a program, the program, when executed by a processor, causing the processor to:
   obtain real time data relating to a path of two or more vessels;
   identify a collision risk between the two or more vessels;
   determine if the collision risk is above a predetermined threshold;
   when the collision risk is above the predetermined threshold, determine one or more collision avoidance manoeuvres by comparing the real-time data with historical navigational data corresponding to the real time data;
   wherein the determining of the one or more collision avoidance manoeuvres is provided by a model having an input of the real-time data and an output of the one or more collision avoidance manoeuvres, and the outputs are provided by model parameters defined using the historical navigation data in which a historic collision risk between two historic vessels reduces;
   wherein the model is an artificial neural network or polynomial expression; and
   provide the one or more collision avoidance manoeuvres to an operator of one of two or more vessels.

* * * * *